US012682780B2

(12) United States Patent
Stevens et al.

(10) Patent No.: US 12,682,780 B2
(45) Date of Patent: Jul. 14, 2026

(54) MOTION PLATFORM APPARATUS AND METHOD OF SUPPORTING A PAYLOAD PLATFORM

(71) Applicant: Ansible Motion Limited, Wiltshire (GB)

(72) Inventors: Robert Stevens, East Harling (GB); Kia Cammaerts, Woking (GB)

(73) Assignee: Ansible Motion Limited, Wiltshire (GB)

( * ) Notice: Subject to any disclaimer, the term of this patent is extended or adjusted under 35 U.S.C. 154(b) by 378 days.

(21) Appl. No.: 18/268,514

(22) PCT Filed: Dec. 20, 2021

(86) PCT No.: PCT/EP2021/086711
§ 371 (c)(1),
(2) Date: Jun. 20, 2023

(87) PCT Pub. No.: WO2022/136225
PCT Pub. Date: Jun. 30, 2022

(65) Prior Publication Data
US 2024/0078927 A1     Mar. 7, 2024

(30) Foreign Application Priority Data
Dec. 24, 2020   (GB) ..................................... 2020606

(51) Int. Cl.
*G09B 9/12*          (2006.01)
(52) U.S. Cl.
CPC .................................... *G09B 9/12* (2013.01)
(58) Field of Classification Search
CPC .................................................... G09B 9/12
See application file for complete search history.

(56) References Cited

U.S. PATENT DOCUMENTS 3,304,628 A * 2/1967 Kaplan .................... G09B 9/14
                                              434/58
3,794,283 A    2/1974 Furno
                  (Continued)

FOREIGN PATENT DOCUMENTS

CN        105939765 A      9/2016
CN        108137291 A      6/2018
                  (Continued)

OTHER PUBLICATIONS

International Search Report and Written Opinion mailed Apr. 19, 2022 for PCT Appl. No. PCT/EP2021/086711, 14 pages.
(Continued)

*Primary Examiner* — Xuan M Thai
*Assistant Examiner* — Sadaruz Zaman
(74) *Attorney, Agent, or Firm* — Sterne, Kessler, Goldstein & Fox P.L.L.C.

(57)          ABSTRACT
A motion platform apparatus (100) for vehicle simulation comprises: a payload platform (134) having peripheral elevation sites (136, 138, 140). The apparatus also comprises a base stage (102) having peripheral anchoring sites. A plurality of linkages (110, 112, 114) of the apparatus (100) is configured to couple the peripheral anchoring sites to the peripheral elevation sites (136, 138, 140), respectively. Each linkage of the plurality of linkages (110, 112, 114) is configured to vary elevation of a respective elevation site (136, 138, 140) of the payload platform (134). The apparatus (100) further comprises a plurality of configurable pneumatic supports (204, 206, 208) respectively configured to adjust pressurisation independently of one another, thereby providing support to the payload platform (134).

15 Claims, 9 Drawing Sheets

(56)                References Cited

U.S. PATENT DOCUMENTS

| | | | | |
|---|---|---|---|---|
| 3,991,487 | A * | 11/1976 | Bede | G09B 9/12 |
| | | | | 434/37 |
| 4,651,589 | A * | 3/1987 | Lambert | B25J 18/06 |
| | | | | 52/646 |
| 5,366,375 | A * | 11/1994 | Sarnicola | G09B 9/12 |
| | | | | 434/37 |
| 5,605,462 | A * | 2/1997 | Denne | H02K 7/00 |
| | | | | 434/45 |
| 5,752,834 | A * | 5/1998 | Ling | G09B 9/12 |
| | | | | 434/58 |
| 6,431,987 | B1 | 8/2002 | Tushar et al. | |
| 6,629,896 | B2 * | 10/2003 | Jones | A63F 13/90 |
| | | | | 472/60 |
| 6,813,595 | B2 * | 11/2004 | Edgar | G09B 9/12 |
| | | | | 434/30 |
| 7,559,766 | B2 * | 7/2009 | Epley | A61B 5/4863 |
| | | | | 434/34 |
| 9,466,223 | B2 * | 10/2016 | Stevens | G09B 9/04 |
| 9,829,149 | B2 * | 11/2017 | Jennings | G09B 9/14 |
| 11,830,382 | B2 * | 11/2023 | Liberatore | G06F 3/016 |
| 11,869,387 | B2 * | 1/2024 | de Oliveira Alves, Jr. | |
| | | | | B25J 13/065 |
| 2005/0091018 | A1 * | 4/2005 | Craft | G07C 5/08 |
| | | | | 703/8 |
| 2012/0282588 | A1 * | 11/2012 | Stevens | G09B 9/04 |
| | | | | 434/365 |
| 2014/0157916 | A1 * | 6/2014 | Vatcher | A63G 31/16 |
| | | | | 74/51 |
| 2014/0188279 | A1 | 7/2014 | Lee et al. | |
| 2015/0354747 | A1 * | 12/2015 | Jennings | F16M 11/18 |
| | | | | 74/99 R |
| 2017/0072327 | A1 | 3/2017 | Wach | |
| 2019/0089871 | A1 * | 3/2019 | Pan | G03B 17/566 |
| 2022/0215771 | A1 | 7/2022 | Warne et al. | |
| 2022/0219093 | A1 | 7/2022 | Ouyang et al. | |
| 2024/0149177 | A1 * | 5/2024 | Stevens | A63G 31/16 |

FOREIGN PATENT DOCUMENTS

| | | | |
|---|---|---|---|
| EP | 1190926 | A2 | 3/2002 |
| EP | 2486558 | B8 | 10/2013 |
| GB | 1080074 | A | 8/1967 |
| GB | 1286028 | A | 8/1972 |
| GB | 2567174 | A | 4/2019 |
| JP | 2004082223 | A | 3/2004 |
| JP | 2008212651 | A | 9/2008 |
| WO | 0138767 | A2 | 5/2001 |
| WO | 2007088314 | A2 | 8/2007 |
| WO | 2010068089 | A1 | 6/2010 |

OTHER PUBLICATIONS

Anonymous: "Motion Platform PS-3TM-1000PS-3TM-1000," Oct. 31, 2020 (Oct. 31, 2020), pp. 1-2, XP055910175, Retrieved from the Internet: URL: https://motionsystems.eu/wp/wp-content /uploads/ 2020/10/MotionSystems_ProductCard_PS-3TM-1000.pdf [retrieved on Apr. 7, 2022].

Copy of Combined Search and Examination Report, dated Jun. 18, 2021 for Application No. GB 2020606.6, 6 pages.

International Search Report and Written Opinion mailed Apr. 7, 2022 for PCT Appl. No. PCT/EP2021/086710, 11 pages.

Search Report, dated Jun. 20, 2021, for Application No. GB 2020605.8, 4 pages.

English Translation of Notice of Reasons for Rejection mailed Aug. 26, 2025 in related Japanese Application No. 2023-532653; 4 pages.

Non-Final Office Action mailed Sep. 17, 2025 in U.S. Appl. No. 18/268,410; 10 pages.

* cited by examiner

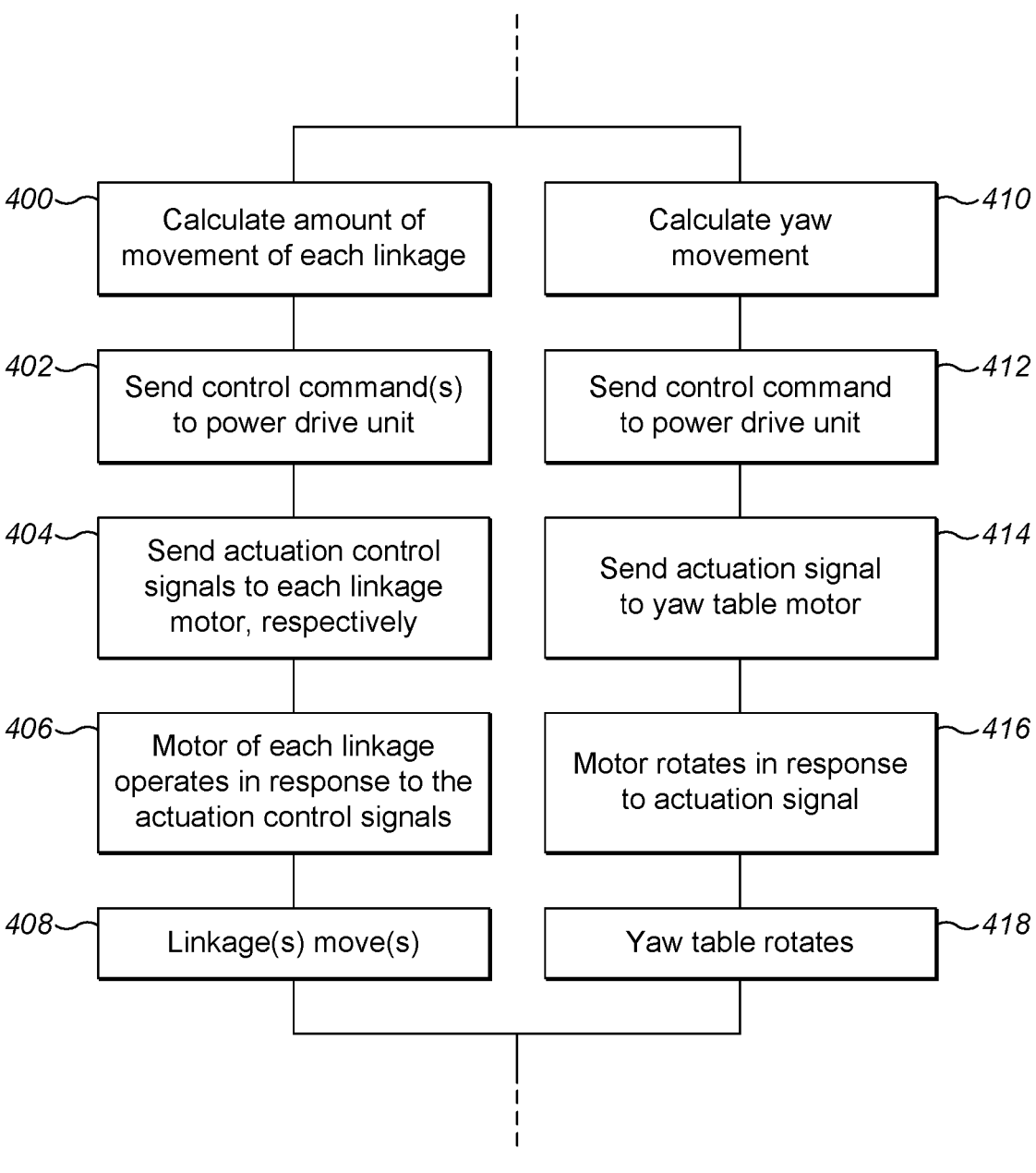

400 — Calculate amount of movement of each linkage

402 — Send control command(s) to power drive unit

404 — Send actuation control signals to each linkage motor, respectively

406 — Motor of each linkage operates in response to the actuation control signals 408 — Linkage(s) move(s)

410 — Calculate yaw movement

412 — Send control command to power drive unit

414 — Send actuation signal to yaw table motor

416 — Motor rotates in response to actuation signal

418 — Yaw table rotates

FIG. 6

MOTION PLATFORM APPARATUS AND METHOD OF SUPPORTING A PAYLOAD PLATFORM

The present invention relates to a motion platform apparatus, of the type that, for example, is capable of movement in three degrees of freedom. The present invention also relates to a method of supporting a payload platform, the method being of the type that, for example, is capable of moving the payload platform in three degrees of freedom.

In the field of motion platforms, as well as others, degrees of freedom are typically referred to as surge, roll, sway, pitch, heave and yaw. Surge is translation along an axis aligned forwards and backwards, roll is rotation about the surge axis, sway is translation along an axis aligned from side to side, pitch is rotation about the sway axis, heave is translation along an axis aligned up and down, and yaw is rotation about the heave axis.

Various architectures are known to provide three degrees of freedom of motion, which are usually heave, pitch and roll mentioned above. It is known to elevate peripheral elevation sites of a payload platform above a base plane by way of a plurality of linkages, each employing a pair of crank members or a single crank member respectively coupled at first ends thereof to the base via an anchored drive motor and at a second end thereof to tip ends of a wishbone member by a revolute joint. A neck end of the wishbone member is coupled to a peripheral elevation site of the peripheral elevation sites. An example of such a motion platform arrangement is a PS-3TM-1000 motion platform available from Motion Systems Michat Stanek, Poland.

The payload platform of a motion platform arrangement is intended to carry a load, for example a simulator cockpit. The degree of extension of the linkages is typically controlled in response to commands from a vehicle simulation control system in order to simulate motion of a vehicle. The heave, pitch and roll position of the simulator cockpit is continuously controlled by raising and lowering the linkages independently. In this regard, it is known to employ electric motors to apply vertical forces via the linkages which taken together result in a total vertical force, a pitch moment and a roll moment applied to the payload platform. However, the cockpit weight due to gravity must be continually reacted with a vertical force. Furthermore, the centre of gravity of the simulator cockpit attached to the payload platform is rarely adequately centred with respect to the payload platform and this will cause a roll moment and pitch moment which must also be continually reacted.

The electric motors have a finite maximum force that each can apply through its respective linkage. For a given design target of payload mass and acceleration when in use a corresponding force-providing capacity is needed from the electric motors. However, a proportion of the force-providing capacity is consumed providing the above-mentioned vertical force, roll moment and the pitch moment to react the cockpit weight due to gravity, thereby reducing the overall force-providing capacity of one or more of the electric motors.

In order to mitigate this problem, it is known to provide a spring mounted centrally beneath the payload platform to support the load of the simulator cockpit. However, the central location of the spring fails to address the offset nature of the centre of gravity of the cockpit with respect to the centre of the payload platform which as mentioned above causes pitch and roll moments which must also be continually reacted. The need to react these pitch and roll moments still therefore requires the use of some of the force-providing capacity of one or more of the electric motors.

According to a first aspect of the present invention, there is provided a motion platform apparatus for vehicle simulation, the apparatus comprising: a payload platform having peripheral elevation sites; a base stage having peripheral anchoring sites; and a plurality of linkages configured to couple the peripheral anchoring sites to the peripheral elevation sites, respectively, the plurality of linkages each being configured to vary elevation of a respective elevation site of the payload platform; and a plurality of configurable pneumatic supports respectively configured to adjust pressurisation independently of one another, thereby providing support to the payload platform.

The plurality of pneumatic supports may be respectively operably coupled to the plurality of linkages. The plurality of pneumatic supports may be respectively spaced and separate from the plurality of linkages.

The apparatus may further comprise: a plurality of actuators configured to move the plurality of linkages respectively over a respective range of extension.

The plurality of actuators may be a plurality of electric motors.

The plurality of linkages may be independently controllable.

Each of the plurality of linkages may have a base stage end and a payload platform end distal from the base stage end; and the plurality of actuators may be respectively operably coupled to the plurality of linkages at the respective base stage end thereof.

The apparatus may further comprise: a processing resource providing a configuration unit; wherein the configuration unit may be configured to receive a plurality of pre-calculated configuration settings in respect of the plurality of configurable pneumatic supports; and the configuration unit may be further configured to control pressurisation of each of the plurality of configurable pneumatic supports in accordance with the plurality of pre-calculated configuration settings.

The plurality of pre-calculated configuration settings may be calculated manually or by way of an automatic calculation procedure.

Each of the plurality of configurable pneumatic supports may be configured to apply a respective support force in accordance with the plurality of configuration settings.

The pre-calculated configuration settings may be calculated as a function of a weight of a payload and a position of a centre of gravity of the payload with respect to the payload platform.

The apparatus may further comprise: a memory configured to store a mass of a payload and a position of a centre of gravity of the payload with respect to the payload platform carrying the payload; a processing resource configured to calculate, when in use, a current extension of a linkage of the plurality of linkages and a required support force to be applied at the payload platform; wherein the processing resource may be further configured to calculate a support force to be applied by a configurable pneumatic support of the plurality of configurable pneumatic supports in response to the calculated current extension of the linkage of the plurality of linkages and the required support force to be applied at the payload platform; and the processing resource may be configured to control pressurisation of the configurable pneumatic support of the plurality of configurable pneumatic supports in accordance with the calculated support force to be applied.

The processing resource may be configured to calculate a plurality of support forces to be applied respectively by the plurality of configurable pneumatic supports in response to respective extensions of the plurality of linkages and respective required support forces to be applied at the payload platform. The processing resource may be configured to control pressurisation of the plurality of configurable pneumatic supports in accordance with the plurality of support forces calculated.

The plurality of configurable pneumatic supports may be configured to change application of the support forces, respectively, in real time.

The processing resource may be configured to monitor a first force applied by a first linkage of the plurality of linkages to a corresponding first elevation site of the plurality of peripheral elevation sites of the payload platform and to calculate a required support force in relation to a predetermined force criterion; and the processing resource may be configured to control a configurable pneumatic support of the plurality of configurable pneumatic supports operably coupled to the first elevation site via the first linkage of the plurality of linkages in order to comply with the predetermined force criterion.

The predetermined force criterion may be a range of forces bounded by a minimum acceptable force and a maximum acceptable force.

The apparatus may further comprise: a manual control operably coupled to the plurality of configurable pneumatic supports, thereby permitting, when in use, respective manual pressurisation of each of the plurality of configurable pneumatic supports.

The plurality of pneumatic supports may be a plurality of air springs. The plurality of air springs may be a plurality of air bellows.

The plurality of linkages may comprise a first linkage; the first linkage may comprise a first arm operably coupled at a first end thereof to a second arm at a first end thereof; the first arm may be operably coupled at a second end thereof to a first anchoring site of the peripheral anchoring sites; the second arm may be operably coupled at a second end thereof to a first elevation site of the peripheral elevation sites; and a first configurable pneumatic support of the plurality of configurable pneumatic supports may be operably coupled to the first linkage.

The first arm may be operably coupled to the second arm by a spherical joint; the first arm may be operably coupled to the first anchoring site by a revolute joint; and the second arm may be operably coupled to the first elevation site by a revolute joint.

The first arm may be a first wishbone member and may have a neck end; the second arm may be a second wishbone member and may have a neck end. The first and second wishbone members may be coupled to each other at the respective neck ends thereof. The first wishbone member may have a tip end and the first wishbone member may be operably coupled to the first anchoring site at the tip end thereof. The second wishbone member may have a tip end and the second wishbone member may be operably coupled to the first elevation site at the tip end thereof.

The apparatus may further comprise: a turntable comprising the base stage.

The apparatus may further comprise: a translation stage linearly translatable in two substantially perpendicular directions; the motion platform apparatus may be operably coupled to the translation stage.

According to a second aspect of the present invention, there is provided a vehicle simulator system, the system comprising the motion platform apparatus as set forth above in relation to the first aspect of the invention.

The system may further comprise a vehicle cockpit disposed upon the payload platform.

The payload may have an off-centre centre of gravity with respect to the payload platform.

The system may further comprise: a display disposed within a field of view; the processing resource may be operably coupled to the display and the motion platform apparatus; wherein the processing resource may control operation of the motion platform apparatus, thereby simulating a performance aspect of a vehicle.

According to a third aspect of the present invention, there is provided a method of supporting a payload platform for a vehicle simulator, the method comprising: coupling a plurality of peripherally-spaced linkages between peripheral anchoring sites of a base stage and a plurality of peripheral elevation sites of the payload platform; the plurality of peripherally-spaced linkages each respectively selectively varying elevation of a respective peripheral elevation site of the plurality of peripheral elevation sites of the payload platform; and adjusting pressurisation independently of one another a plurality of configurable pneumatic supports to provide support to the payload platform.

It is thus possible to provide an apparatus and method that obviates or at least mitigates the pitch and roll moments experienced when a single centrally-mounted support is employed. The apparatus and method therefore improve the force-providing capacity of electric motors of the apparatus via the linkages available to accelerate dynamically the payload. It therefore follows that it is then possible to employ more compact motors to provide the required force capacity. Furthermore, the use of such motors reduces the overall bill of materials for the apparatus.

At least one embodiment of the invention will now be described, by way of example only, with reference to the accompanying drawings, in which:

FIG. 6 is a flow diagram of a part of the flow diagram of FIG. 5 in greater detail;

Throughout the following description, identical reference numerals will be used to identify like parts.

Figure 1:
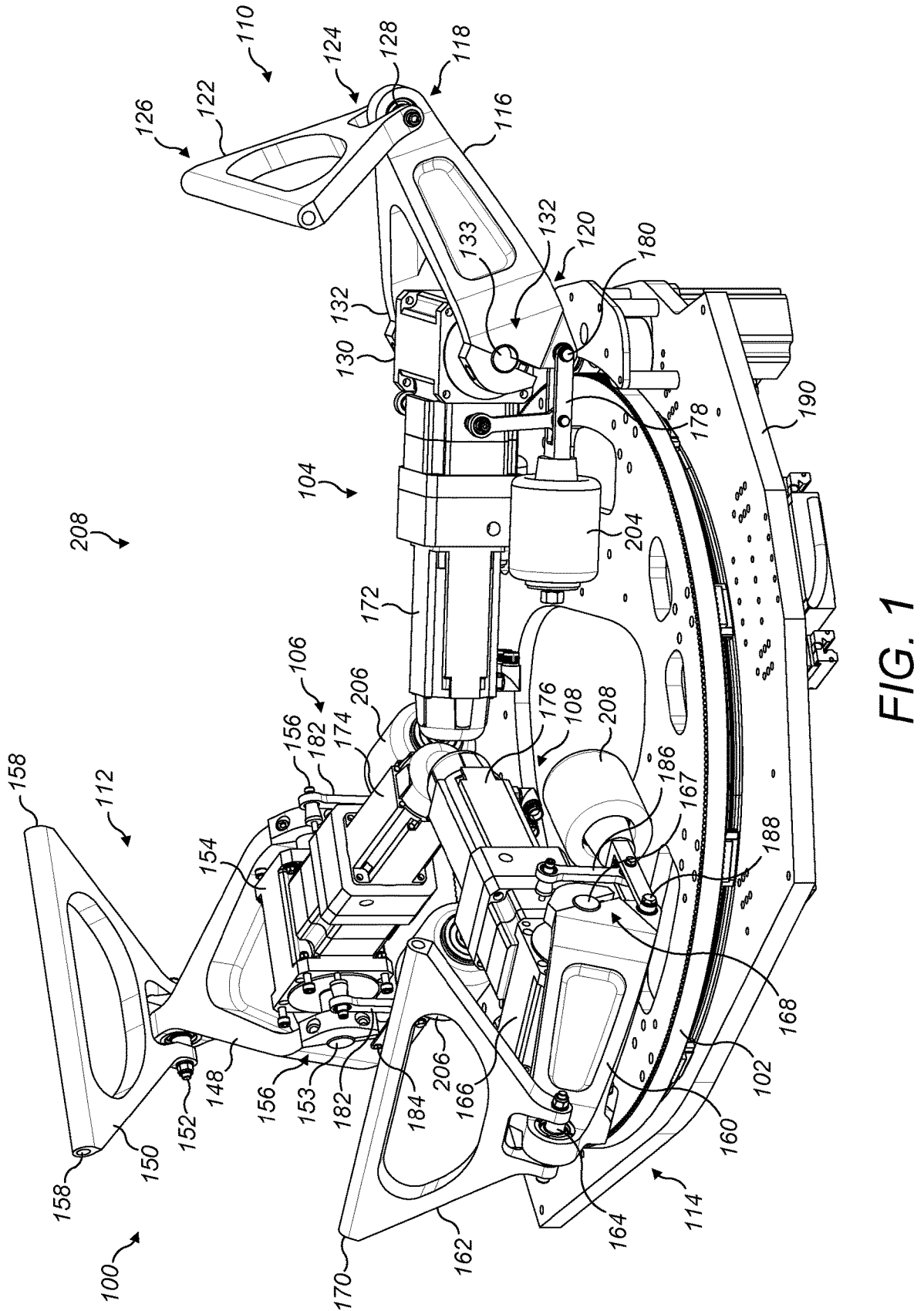
FIG. 1 is a first perspective view of a motion and gearbox layout of a motion platform apparatus constituting an embodiment of the invention.

Referring to FIG. 1, a motion platform apparatus 100 comprises a base stage 102 carrying a first drive system 104, a second drive system 106 and a third drive system 108 radially arranged on the base stage 102 and fixedly attached to the base stage 102. The motion platform apparatus 100 also comprises a first linkage 110, a second linkage 112 and a third linkage 114. The first linkage 110 comprises a first arm 116 having a first end 118 and a second end 120. The first linkage 110 also comprises a second arm 122 having a first end 124 and a second end 126. The first arm 116 is operably coupled at the first end 118 thereof to the second arm 122 at the first end thereof 124 by a first spherical joint 128. A first gearbox 130 of the first drive system 104 is disposed upon and fixed to the base stage 102, the first arm 116 being operably coupled at the second end 120 thereof to the first gearbox 130 by a first revolute joint 132 formed with a first output shaft 133 of the first gearbox 130. The first gearbox 130 provides a first anchoring site on the base stage 102.

Figure 2:
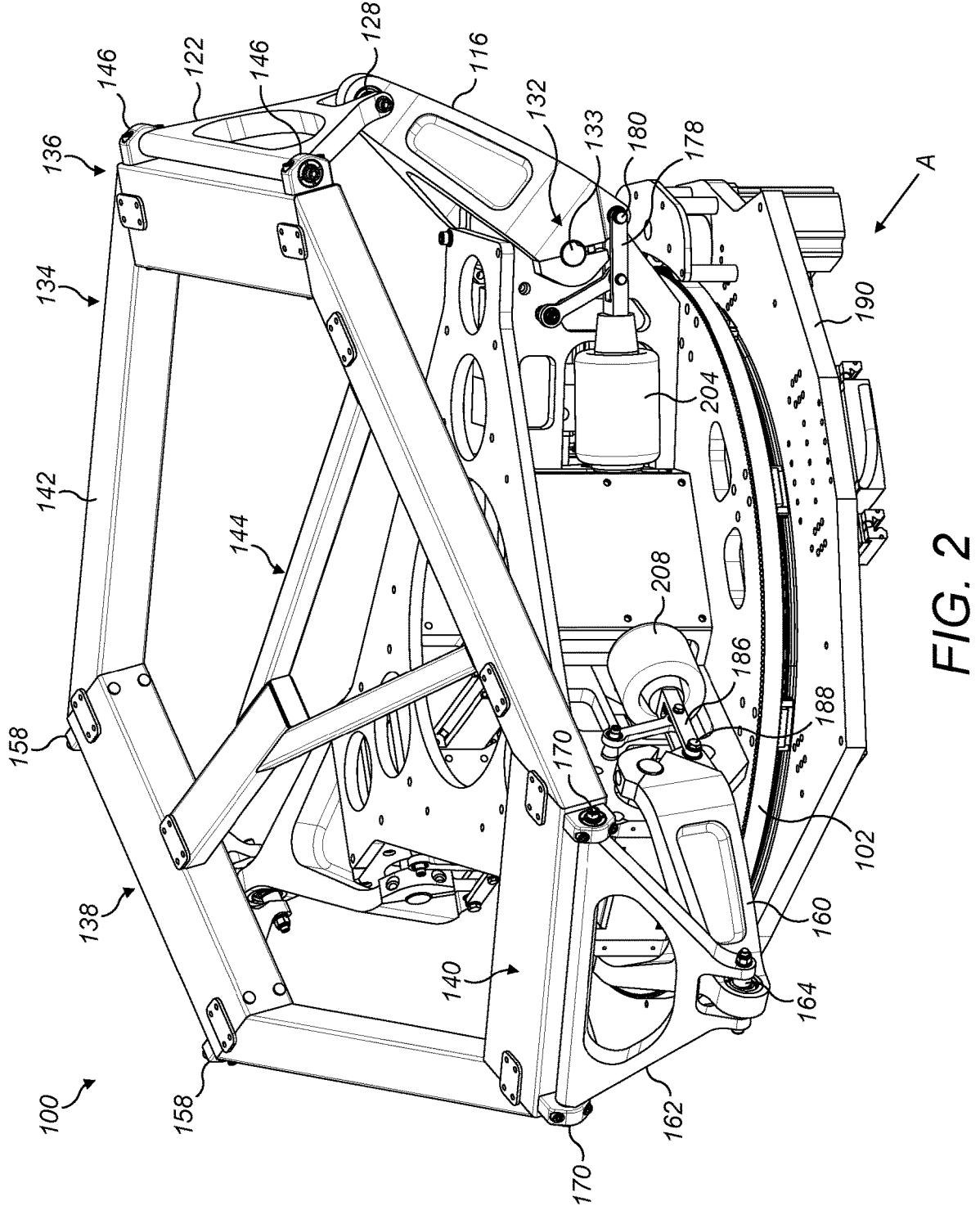
FIG. 2 is a second perspective view of the motion platform apparatus of FIG. 1 including a payload platform.
Figure 3:
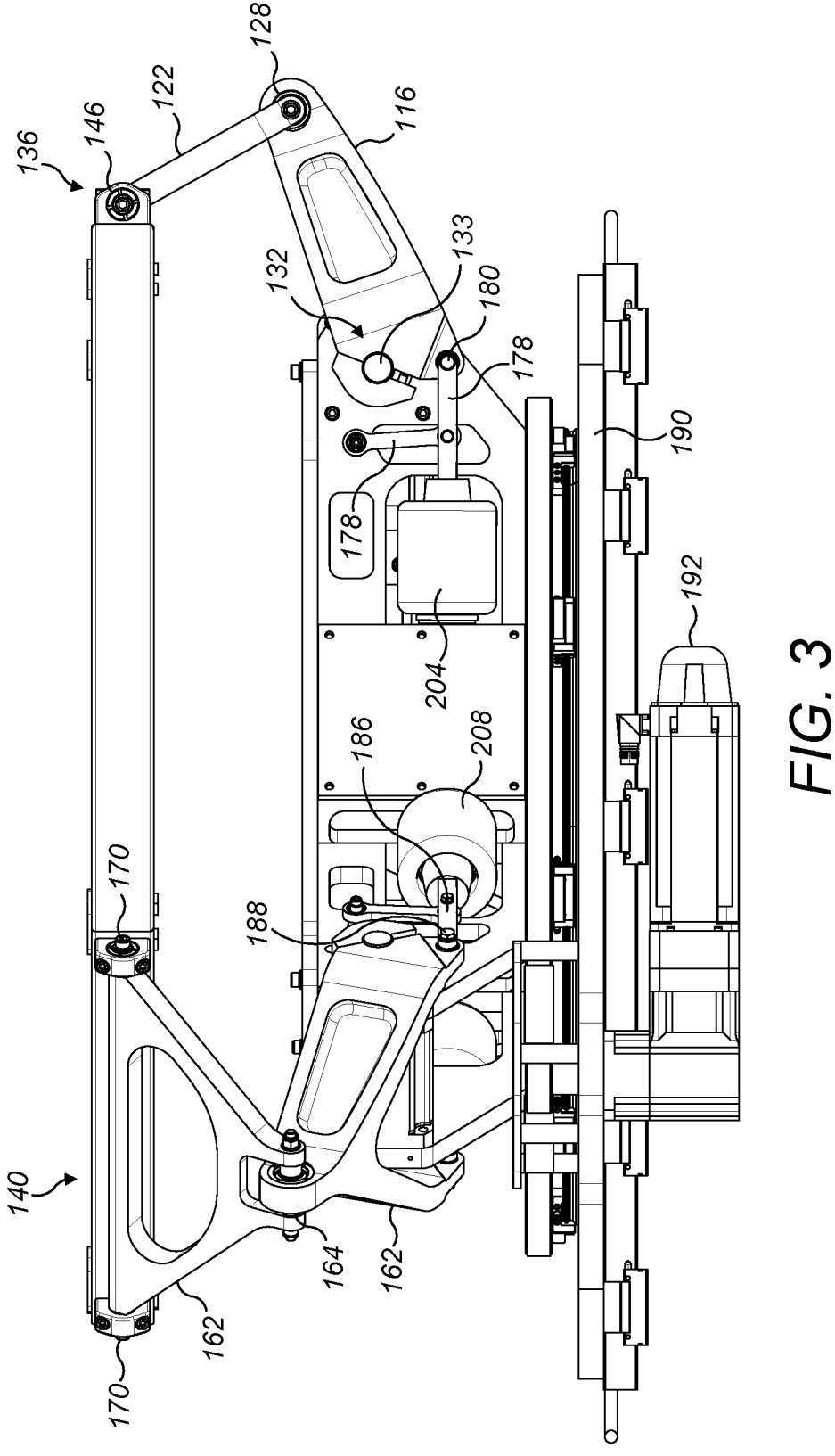
FIG. 3 is a side elevation of the motion platform apparatus of FIG. 2 from direction A.

Referring to FIGS. 2 and 3, the motion platform apparatus 100 further comprises a payload platform 134 having a first peripheral elevation site 136, a second peripheral elevation site 138 and a third peripheral elevation site 140. In this example, the payload platform 134 has a hexagonal periphery and is planar. The payload platform 134 is formed, in this example, by interconnected peripheral tubular members 142 and a Y-shaped cross-member 144 for support. Of course, the skilled person will appreciate that the payload platform 134 can be constructed in a number of different ways and alternatives to the peripheral tubular members 142 and/or the Y-shaped cross-member 144, for example a plate, can be employed. The second arm 122 is operably coupled at the second end 126 thereof to the first peripheral elevation site 136 of the payload platform 134 by a second revolute joint 146.

Referring back to FIG. 1, the second linkage 112 comprises a first arm 148 having first and second ends, and a second arm 150 having first and second ends. The first arm 148 is operably coupled at the first end thereof to the second arm 150 at the first end thereof by a second spherical joint 152. A second gearbox 154 of the second drive system 106 is disposed upon and fixed to the base stage 102, the first arm 148 being operably coupled at the second end thereof to the second gearbox 154 by a third revolute joint 156 formed with a second output shaft 153 of the second gearbox 154. The second gearbox 154 provides a second anchoring site on the base stage 102. Referring to FIG. 2, the second arm 150 is operably coupled at the second end thereof to the second peripheral elevation site 138 of the payload platform 134 by a fourth revolute joint 158.

Referring back to FIG. 1, the third linkage 114 comprises a first arm 160 having first and second ends, and a second arm 162 having first and second ends. The first arm 160 is operably coupled at the first end thereof to the second arm 162 at the first end thereof by a third spherical joint 164. A third gearbox 166 of the third drive system 106 is disposed upon and fixed to the base stage 102, the first arm 160 being operably coupled at the second end thereof to the third gearbox 166 by a fifth revolute joint 168 formed with a third output shaft 167 of the third gearbox 166. The third gearbox 166 provides a third anchoring site for the base stage 102. Referring to FIGS. 2 and 3, the second arm 162 is operably coupled at the second end thereof to the third peripheral elevation site 140 of the payload platform 134 by a sixth revolute joint 170.

In this example, the first arms 116, 148, 160 are respectively first wishbones and the second arms 122, 150, 162 are respectively second wishbones. The first and second wishbones respectively constitute first and second forks. The first forks each have a tip end 120, and a neck end 118. Likewise the second forks also each have a tip end 126 and a neck end

124. In this example, the first and second forks are respectively coupled to each other at the neck ends 118, 124 thereof. The tip ends 120 of the first forks are respectively coupled to the first, second and third peripheral anchoring sites, and the tip ends 126 of the second forks are respectively coupled to the first, second and third peripheral elevation sites 136, 138, 140.

As the skilled person will appreciate, various designs of spherical joint exist. In this example, the first, second and third spherical joints 128, 152, 164 are first, second and third ball joints, respectively. However, use of other designs of spherical joint is contemplated.

Turning to FIG. 1, the first drive system 104 comprises a first motor, for example a first electric motor 172, operably coupled to the first gearbox 130. The second drive system 106 comprises a second motor, for example a second electric motor 174, operably coupled to the second gearbox 154. The third drive system 108 comprises a third motor, for example a third electric motor 176, operably coupled to the third gearbox 166. The first, second and third motors 172, 174, 176 respectively constitute first, second and third actuators.

Figure 9:
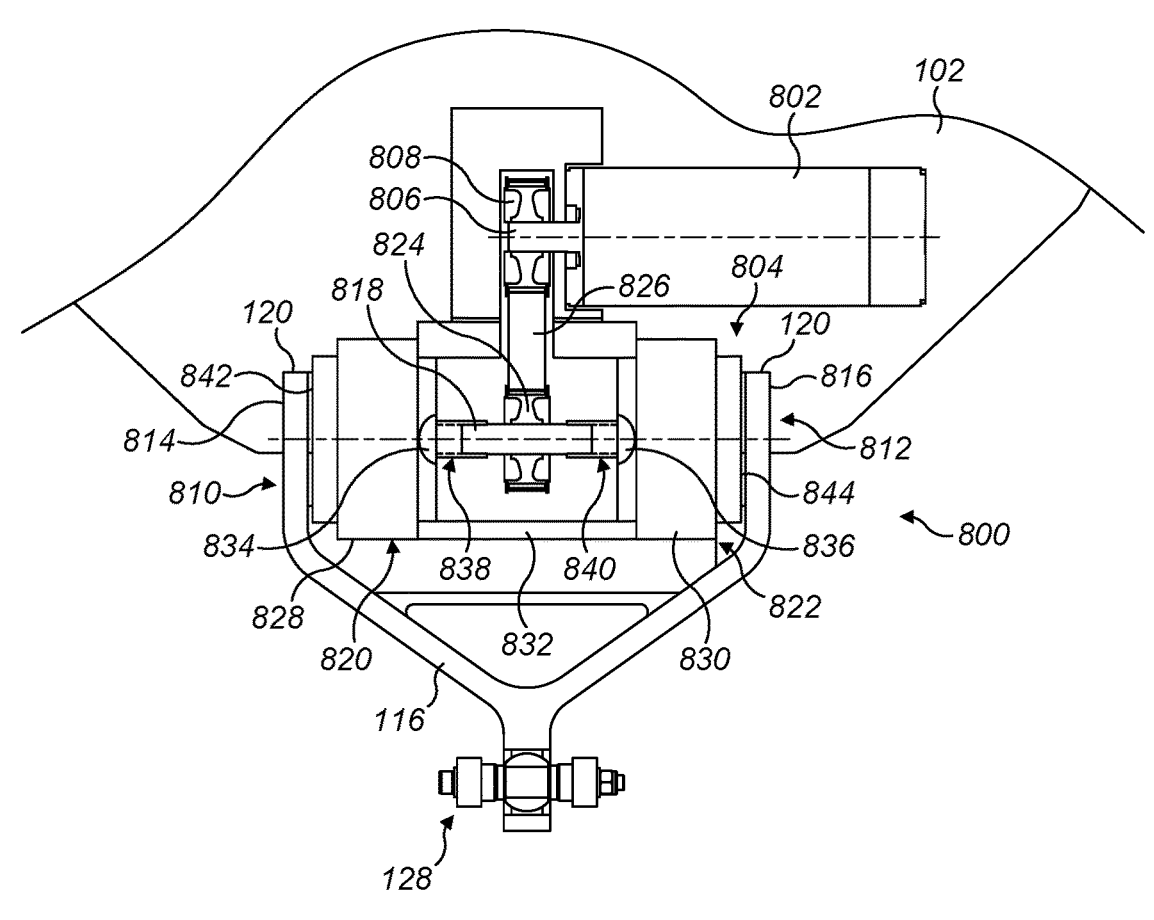
FIG. 9 is a schematic diagram of an alternative drive system to the drive systems of FIGS. 1, 2 and 3.

In another embodiment (FIG. 9), an alternative drive system configuration to the configuration of the first, second and third drive systems 104, 106, 108 described above can be employed. For the sake of simplicity and conciseness of description only one of the alternative drive system configurations will be described. However, the skilled person should appreciate that the same drive configuration is, in this example, employed as the second and third drive systems 106, 108. In this example, the alternative configuration of the first drive system 104 will therefore be described.

As in the previous example, a first alternative drive system 800 constituting the alternative to the first drive system 104 is radially arranged on the base stage 102 and fixedly attached to the base stage 102 in a manner to be described later herein. The first alternative drive system 800 comprises an offset electric motor 802 operably coupled to a paired gearbox arrangement 804. The offset motor 802 comprises a motor output shaft 806 carrying a first pulley 808. The paired gearbox arrangement 804 is disposed between the tip ends 120 of the first lower control arm 116. The tip ends 120 comprise a first side end 810 and a second side end 812, the first side end 810 comprising one or more first connecting points 814 and the second side end 812 comprising one or more second connecting points 816. The paired gearbox arrangement 804 comprises a drive shaft 818 that extends between a first side gearbox 820 located at the first side end 810 and a second side gearbox 822 located at the second end 812. The drive shaft 818 of the paired gearbox arrangement 804 carries a second pulley 824, the first pulley 808 being coupled to the second pulley 824 by a drive belt 826, which thus engages the first and second pulleys 808, 824. It should therefore be appreciated that a first longitudinal axis of the motor output shaft 806 is disposed in parallel with a second longitudinal axis of the drive shaft 818 and the motor output shaft 806 is disposed opposite the drive shaft 818 in overlapping relation. The offset motor 802 is offset with respect to the drive shaft 818.

The first side gearbox 820 comprises a first housing 828 and the second side gearbox 822 comprises a second housing 830. A central mounting structure 832 is fixed to the base stage 102, the first and second side gearboxes 820, 822 being mounted to the central mounting structure 832. The central mounting structure 832 also houses the drive belt 826 and supports the offset motor 802, and serves to transfer loads between the first lower control arm 116 to the base stage 102.

The first side gearbox 820 comprises a first gearbox input shaft 834, constituting a first torque input, and the second side gearbox 822 comprises a second gearbox input shaft 836, constituting a second torque input. The first and second gearbox input shafts 834, 836 respectively comprise first and second coaxial apertures for receiving a first end 838 and a second end 840 of the drive shaft 818, which extends coaxially with the first and second gearbox input shafts 834, 836. The second pulley 824 is located centrally between the first and second gearbox input shafts 834, 836. The paired gearbox arrangement 804 also comprises a first output flange 842, constituting a first outwardly facing torque output, at the first side end 810 and a second output flange 844, constituting a second outwardly facing torque output, at the second side end 812. The first output flange 842 is coupled to the first connecting points 814 of the first lower control arm 116 and the second output flange 844 is coupled to the second connecting points 816 of the first lower control arm 116 such that an axis of rotation of the tip ends 120 of the first lower control arm 116 are coaxial with central axes of the first and second output flanges 842, 844.

The torque required to transfer the loads between the first lower control arm 116 and the base stage 102 requires, in this example, the paired gearbox arrangement 804 to provide a high reduction gear ratio. The paired gearbox arrangement 804 is mechanically optimised to minimise mass, maximise stiffness and minimise volume as well as deliver the same input torque to both the first and second side ends 810, 812 of the first lower control arm 116.

In operation, in order to rotate the first lower control arm 116 relative to the base stage 102, the offset motor 802 is activated, causing the motor output shaft 806 and hence the first pulley 808 to rotate. The first pulley 808 therefore drives the second pulley 824 using the drive belt 826. The second pulley 824 rotates the drive shaft 818 and therefore the first and second gearbox input shafts 834, 836 coupled to the drive shaft 818. The first and second output flanges 842, 844 then rotate in response to rotation of the first and second gearbox input shafts 834, 836, but at a slower rate of rotation owing to the above-mentioned gearing ratio. Rotation of the first and second output flanges 842, 844 respectively coupled to the first and second side ends 810, 812 of the first lower control arm 116 serves to rotate the first lower control arm 116 up or down which raises or lowers the spherical joint 128.

The use of the first and second side gearboxes 820, 822 permits substantially half the torque to be applied to each of the first and second side ends 810, 812 as compared with use of a single gearbox mounted to one side of the first lower control arm 116. Rotational inertia in yaw is thus reduced as compared with other mechanical arrangements having the same total torque transmission ability. Furthermore, coupling the drive belt 826 on a low torque side of the first and second side gearboxes 820, 822 optimises the stiffness of the motion platform apparatus 100 by reducing elongation of the drive belt.

Referring to FIG. 3, the base stage 102 is, in the above examples, rotatably mounted upon a motion stage platform 190 and constitutes a turntable. The base stage 102 is driven by a motor and gearbox arrangement, constituting a yaw table motor and gearbox unit 192, via a circumferential drive belt (not shown). The ability to rotate the base stage 102 and hence the payload platform 134 is optional and depends upon the implementation employed. In another example, the base stage 102, and optionally if provided the motion stage platform 190, is mounted on a translation stage system that is linearly translatable in two substantially perpendicular directions, for example a surge-sway motion stage system (not shown), to provide surge or sway motion of the payload platform 134. The surge-sway motion stage system can be any suitable configuration to translate the payload platform 134 and/or base stage 102 along surge or sway axes. However, the provision of the surge-sway motion stage system is not central to understanding the examples set forth herein and so will not be described in further detail.

Figure 10:
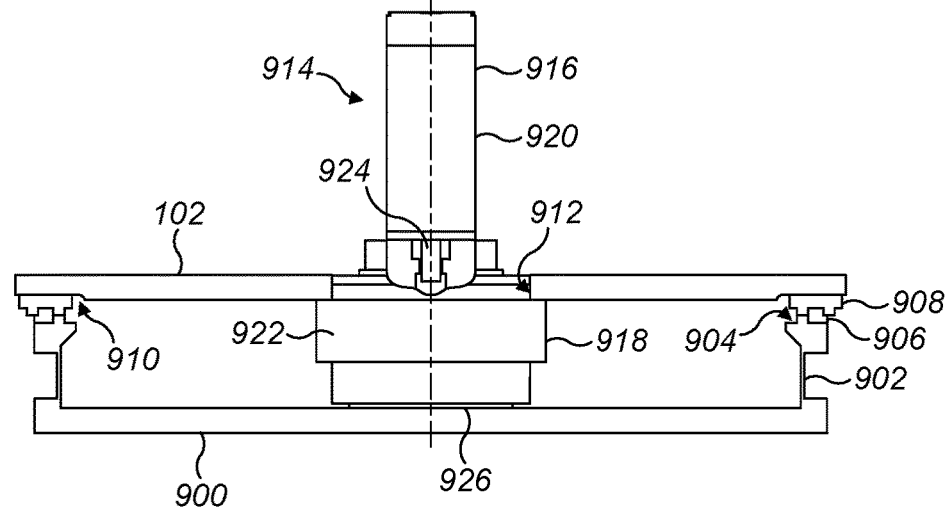
FIG. 10 is a schematic diagram of a yaw table drive system.

In a further embodiment, another driving mechanism for the base stage 102, and alternative to the motor and gearbox unit/drive belt arrangement of the previous examples, is employed. Referring to FIG. 10, the motion stage platform 190 is a non-rotatable lower stage 900, for example a substantially circular stage, although other shaped stages can be employed, comprising an upstanding peripheral wall 902 extending substantially perpendicularly away from the lower stage 900 towards the base stage 102. The peripheral side wall 902, for example a circumferential side wall, comprises a first opposing surface 904 carrying a circumferential bearing rail 906. The base stage 102 is rotary and disposed opposite the lower stage 900 in spaced relation thereto. The base stage 102 comprises a circumferential bearing carriage 908 on an underside of the base stage 102, constituting a second opposing surface 910. The circumferential bearing carriage 908 cooperates with the circumferential bearing rail 906, and constitutes a complementary peripheral bearing arrangement, in order to facilitate low friction rotational motion of the rotary base stage 102 when in use. The rotary base stage 102 comprises a central aperture 912 therethrough for receiving a yaw drive arrangement 914. In this example, the yaw drive arrangement 914 comprises a centrally mounted motor 916 operably coupled to a centrally mounted gearbox 918, the centrally mounted motor 916 having a motor housing 920 and the centrally mounted gearbox 918 having a gearbox housing 922. The centrally mounted motor 916 comprises an output shaft 924 operably coupled to an input shaft (not shown) of the centrally mounted gearbox 918. The centrally mounted gearbox 918 comprises a gearbox output flange or surface 926. The gearbox output flange 926 is centrally mounted and fixedly secured to the lower stage 900 and the gearbox housing 922 is fixedly secured to the base stage 102. The base stage 102 comprises an axis of rotation that is coaxial with a centre of the lower stage 900.

In this example, the base stage 102 is as described in relation to previous examples and is configured to carry the first linkage 110, the second linkage 112 and the third linkage 114. However, it should be appreciated that in other embodiments, other linkage configurations can be employed as opposed to the linkage configuration described herein comprising a specific combination of revolute and spherical joints.

In operation, when driven, the output shaft 924 of the centrally mounted motor 916 rotates in response to an input control signal. As the gearbox output flange 926 is secured to the lower stage and is not free to rotate, the motor housing 920 and the gearbox housing 922, which are secured to the rotary base stage 102 that is free to rotate as facilitated by the circumferential bearing rail and carriage 906,908, all rotate together relative to the lower stage 900. Owing to the more direct drive path between the centrally mounted motor 916 and the base stage 102, as compared with previously described examples, yaw torques can be applied by the centrally mounted motor 916 to the base stage 102 with improved stiffness.

In the above example, the peripheral side wall 902 extends away from the lower stage 900 to provide a space between the lower stage 900 and the base stage 102, which can conveniently be used to locate electrical cabling and the like. However, the provision of the peripheral side wall 902 is optional and the circumferential bearing rail 906 can be secured to the periphery of the lower stage 900 where such additional space between the lower stage 900 and the base stage 102 is not required.

As in previous examples, the lower stage 900 can optionally be mounted on a translation stage system that is linearly translatable in two substantially perpendicular directions in order to provide surge or sway.

Figure 4:
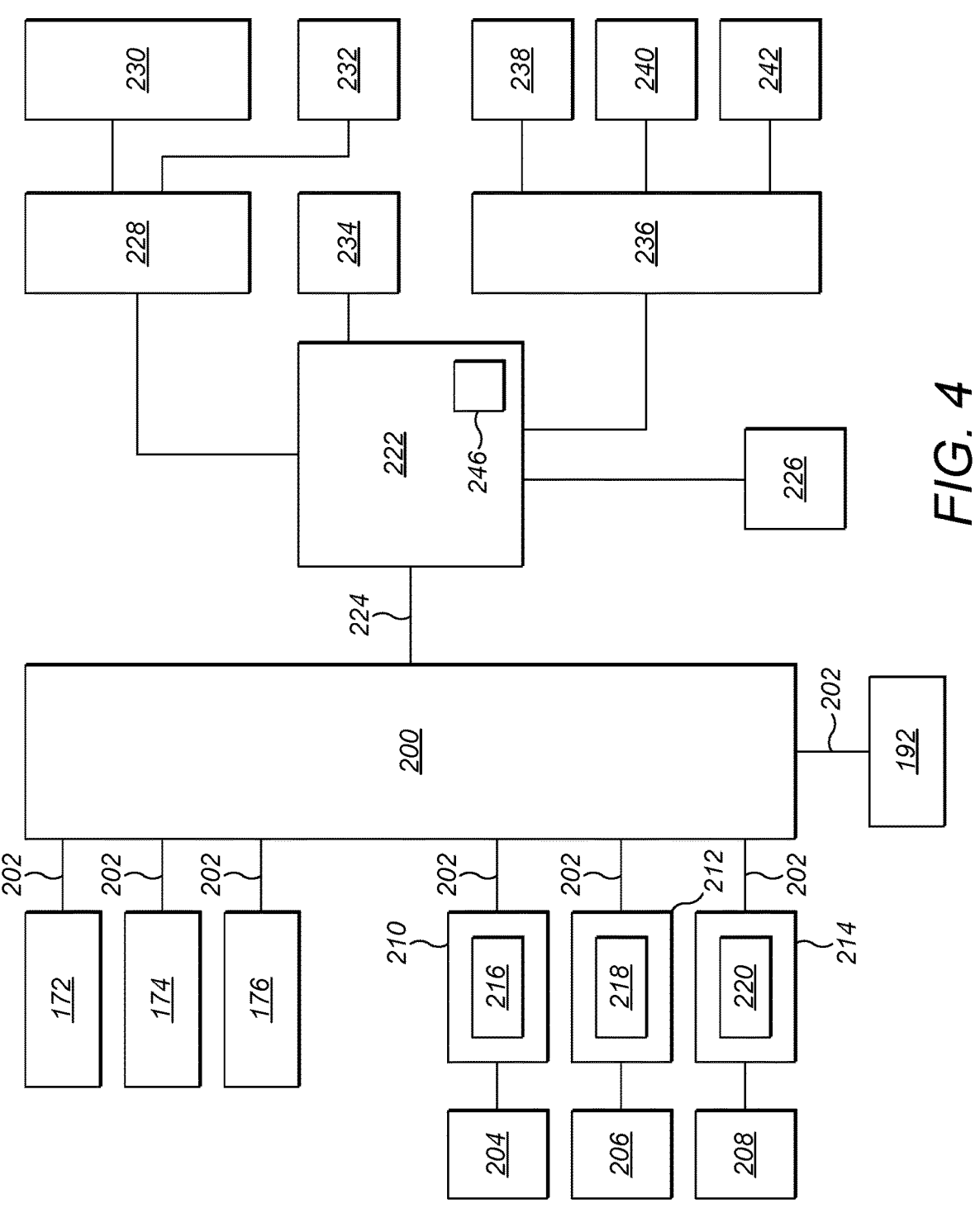
FIG. 4 is a schematic diagram of a control system for the apparatus of FIGS. 1 to 3.

Referring to FIG. 4, the first motor 172 is, in this example operably coupled to a first output of a power drive unit 200 via a wiring loom 202. Similarly, the second and third motors 174, 176 are operably coupled to a second output and a third output of the power drive unit 200, respectively, via the wiring loom 202. When implemented for rotational motion about a heave-axis (yaw), the yaw table motor and gearbox unit 192, for example, is operably coupled to the power drive unit 200 via the wiring loom 202.

Referring to FIGS. 1 and 4, the motion platform apparatus 100 comprises, in this example, a first pair of configurable pneumatic supports 204 operably coupled to the first lower control arm 116 via a first pair of four-bar linkage arrangements 178 respectively at either side of the first gearbox 130. Each four-bar linkage arrangement of the first pair of four-bar linkage arrangements 178 is respectively coupled to a first hinge joint 180 of the first lower control arm 116, which is disposed off-centre relative to the first revolute joint 132. The motion platform apparatus 100 also comprises a second pair of configurable pneumatic supports 206 and a third pair of configurable pneumatic supports 208. The second pair of pneumatic supports 206 is coupled to the second lower control arm 148 via a second pair of four-bar linkage arrangements 182 respectively at either side of the second gearbox 154. Each four-bar linkage arrangement of the second pair of four-bar linkage arrangements 182 is coupled to a second hinge joint 184 of the second lower control arm 148, which is disposed off-centre relative to the third revolute joint 156. The third pair of pneumatic supports 208 is coupled to the third lower control arm 160 via a third pair of four-bar linkage arrangement 186 respectively at either side of the third gearbox 166. Each four-bar linkage arrangement of the third pair of four-bar linkage arrangements 186 is coupled to a third hinge joint 188 of the third lower control arm 160, which is disposed off-centre relative to the fifth revolute joint 168.

The first, second and third linkages 110, 112, 114 each comprise a base stage end and a payload platform end distal from the base stage end, the first, second and third pneumatic supports 204, 206, 208 being respectively coupled to the first, second and third linkages 110, 112, 114, at the base stage ends of the first, second and third linkages 110, 112, 114.

Although the first, second and third pneumatic supports 204, 206, 208 described herein are pairs of pneumatic supports, the skilled person should appreciate that one or more of the first, second and third pneumatic supports 204, 206, 208 can be single pneumatic supports operably coupled to the respective first, second or third lower control arms 116, 148, 182 via respective pairs of four-bar linkage arrangements 178, 182, 186, for example at one side of the first, second and third gearboxes 130, 154, 166, respectively. Indeed, it should also be appreciated that although four-bar linkage arrangements are described herein, other linkage configurations can be employed. In this example, the first, second and third pneumatic supports 204, 206, 208 are spaced about the motion platform apparatus 100 and, although coupled thereto, are separate from the first, second and third linkages 110, 112, 114.

It should also be appreciated that in some examples the use of the first, second and third pneumatic supports 204, 206, 208 is optional.

When the first, second and third pneumatic supports 204, 206, 208 are employed, the power drive unit 200 is also operably coupled to a first pneumatic inflation unit 210, a second pneumatic inflation unit 212 and a third pneumatic inflation unit 214 via the wiring loom 202, the first, second and third pneumatic inflation units 210, 212, 214 being operably coupled to the first, second and third pairs of pneumatic supports 204, 206, 208, respectively. The first, second and third pneumatic inflation units 210, 212, 214 respectively comprise a first pneumatic reservoir 216, a second pneumatic reservoir 218 and a third pneumatic reservoir 220 to store pneumatic fluid. In this example, the first, second and third pneumatic supports 204, 206, 208 are air springs. In some examples, the air springs can be formed from a bellows structure, i.e. the air springs may be air bellows. Of course, as already mentioned above, in another example single pneumatic supports can be employed. In such an example, the first, second and third pneumatic reservoirs 216, 218, 230 can respectively serve the single pneumatic supports employed. In other examples, the use of single pneumatic supports or pairs of pneumatic supports for each lower control arm 116, 148, 160 can share a common pneumatic reservoir or a number of common pneumatic reservoirs.

In a further example, a vehicle simulator system comprises the motion platform apparatus 100 and can optionally comprise the base stage 102 rotatably mounted on the motion stage platform 190. The vehicle simulator system can also optionally comprise the surge-sway motion stage system mentioned above.

In any event, the power drive unit 200 is operably coupled to a processing resource 222 via a data bus 224. The processing resource 222 can be a stand-alone computing apparatus, which can be application specific or a programmed general purpose computing apparatus. In other examples, the processing resource 222 can be a distributed system, where the processing capability can be distributed over more than one processing apparatus, optionally located at different locations. In this example, the processing resource 222 is a server rack executing software to implement the vehicle simulator system. Any suitable operating system can be employed, for example but not exclusively, Linux™ or Windows™.

The processing resource 222 is operably coupled to a data store, for example a storage device 226 or a bank of storage devices, which can be hard drives, digital memory or any combination thereof. The storage device 226 stores, for example, configuration data concerning one or more vehicles to be simulated, including performance and/or handling characteristics of the vehicles to be simulated. The storage device 226 can also store data concerning one or more driving terrains, including visual data, geospatial data and data to enable views from a simulator cockpit to be rendered. In this regard, it should be appreciated that the simulator cockpit is disposed upon the payload platform 134 of the vehicle simulator system. The skilled person will appreciate that other data can be stored by the storage device 226, but as the type of data stored is not core to an understanding of the examples set forth herein, the content of the storage device 226 will not be described in further detail.

The processing resource 222 is operably coupled to a display driver system 228, the display driver system 228 being operably coupled to a display output system 230, for example projectors and a panoramic screen for projection thereon of a simulated environment, the screen being disposed within a field of view of a driver located on the payload platform 134 when part of a vehicle simulator system. The display driver unit 228 is, in this example, also operably coupled to cockpit instruments 232, for example a graphical dashboard display and side and rear-view mirror simulator displays (not shown).

The processing resource 222 is also operably coupled to an audio output system 234 for providing a driver with simulated audio in connection with simulated motion of the simulated vehicle. The processing resource 222 is also operably coupled to an input processing unit 236, the input processing unit 236 being operably coupled to, for example, a so-called simulator pedal unit 238, a simulator gear shifter 240 and a simulator steering wheel 242. Of course, the skilled person will appreciate that other input devices can be provided in the cockpit.

Figure 5:
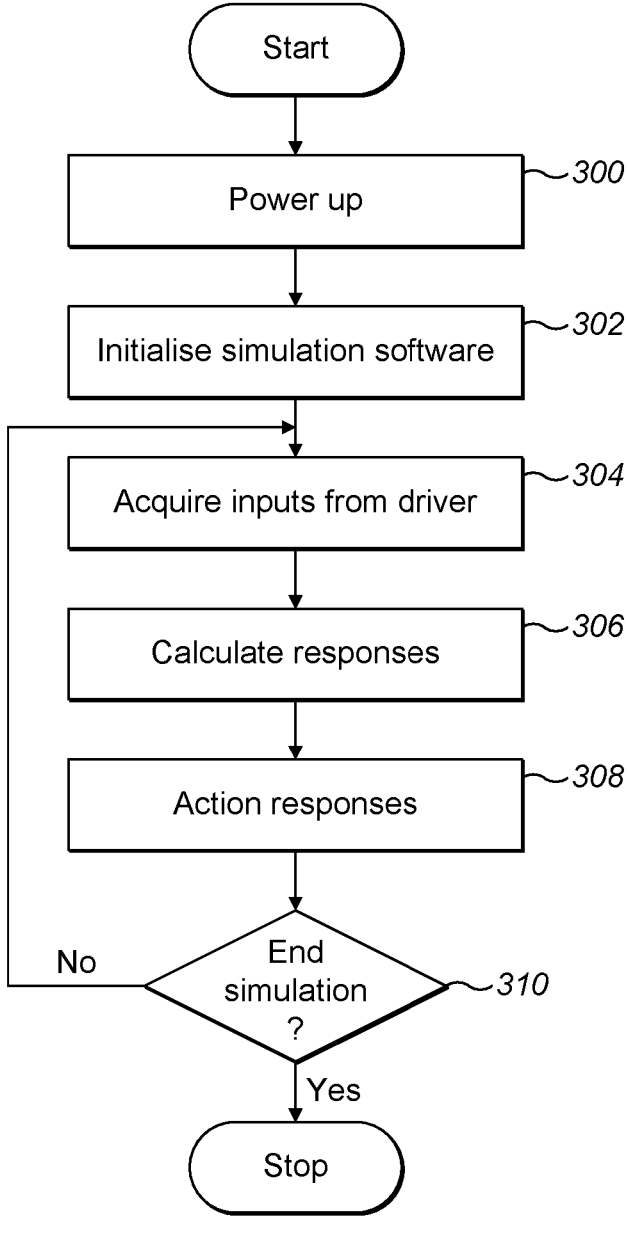
FIG. 5 is a flow diagram of a method of displacing a payload platform constituting another embodiment of the invention.

Referring to FIG. 5, in operation, the motion platform apparatus 100 including the control system of FIG. 4 is powered up (Step 300) and the software for controlling the motion platform apparatus 100 is launched and initialised (Step 302). A driver can enter the cockpit disposed on the payload platform 134 either before or after power up and initialisation of the software (Steps 300 and 302). Once the software has been initialised (Step 302), the driver can begin to operate the driving simulation system as a driver. In other examples, the simulated vehicle can be driven by the simulation system, a passive human passenger residing in the cockpit for the duration of the simulation, for example: to experience a replay of a previously recorded driving sequence, to be driven by an autonomous driving controller, and/or to conduct research into the human perception of different motions. However, in the present example, the control system is configured to acquire inputs (Step 304) from actions performed by the driver, for example as provided through the input devices, such as the simulator pedal unit 238, the simulator gear shifter 240 and the simulator steering wheel 242. Upon receiving one or more inputs via the input processing unit 236, the processing resource 222 calculates (Step 306) responses in terms of controlling the motion platform apparatus 100 and then provides control commands to the power drive unit 200 in order for the responses to be performed (Step 308) by the first linkage 110, the second linkage 112 and/or the third linkage 114, the rotatable base stage 102 and/or the first pair of pneumatic supports 204, the second pair of pneumatic supports 206 and/or the third pair of pneumatic supports 208. Further details of the calculation and actioning of responses is described hereinbelow with reference to FIG. 6.

Following performance of the response(s), the processing resource 222 determines (Step 310) whether an instruction has been received to terminate the simulation. In the event that no termination instruction has been received, the processing resource 222 continues (Steps 304 to 310) to perform the above-described steps until such time as an instruction to terminate the simulation has been received whereupon the processing resource 222 terminates the simulation.

Although not described, the skilled person will appreciate that the processing resource 222 also manages and coordinates other outputs, for example in the form of audible and visual responses. However, as these aspects are not core to an understanding of the operation of the motion platform apparatus 100, for the sake of clarity and conciseness of description, they will not be described further herein.

Turning to FIG. 6, operation of the first, second and third linkages 110, 112, 114 and the rotatable base stage 102 will now be described. For the sake of simplicity and clarity of description, and so as not to detract from the salient aspects of the examples set forth herein, the operation will be described without reference to any use of the surge-sway motion stage system described above.

As will be appreciated, control of the first, second and third linkages 110, 112, 114 and the rotation of the base stage 102 is independent. As such, control of the linkages 110, 112, 114 and the base stage 102 occurs in parallel.

In relation to the linkages 110, 112, 114, based on a model of a vehicle being simulated, the processing resource 222 engages in multiple processing stages that ultimately result in movement of the cockpit residing on the motion payload platform 134. For example, when a drive actively interacts with the simulation system, prior to movement reaching the stage of energising electric motors to move the payload platform 134 in a desired manner, the processing resource 222 uses a physics model of the vehicle being simulated and inputs from the driver and simulated terrain in order to determine motion of the vehicle. In this regard, the physics model provides, over time, sets of accelerations describing the motion of the simulated vehicle. A motion cue filter (not shown) uses each set of accelerations output by the vehicle physics model in order to determine a set of accelerations to be provided by the motion platform apparatus 100 so that the driver perceives the accelerations calculated by the physics model. As such, the processing resource 222, implementing the motion cue filter, calculates (Step 400) the movement in 3 degrees of freedom that the cockpit has to undergo in order to respond to motion cues derived from input from the driver using the input devices mentioned above and the simulated driving environment. The processing resource 222 then calculates (Step 400) the corresponding movements required by one or more of the linkages 110, 112, 114, and thus actuation of one or more of the motors 172, 174, 176 to achieve the required cockpit motion. The processing resource 222 generates one or more control commands (Step 402) and communicates the one or more control commands to the power drive unit 200. The power drive unit 200 then sends (Step 404) actuation control signals to the one or more of the motors 172, 174, 176 that need to move. Thereafter, in response to the actuation control signal(s), the motor 172, 174, 176 associated with each of the linkages 110, 112, 114, respectively, actuates (Step 406).

Depending upon the motor 172, 174, 176 actuated and direction of actuation, the output shafts 133, 153, 167 of the first, second and/or third gearboxes 130, 154, 166 rotate the first, second and/or third lower control arms 116, 148, 160 in a revolute manner respectively, thereby causing the linkages 110, 112, 114 to raise or lower (Step 408) and thus the elevation of the respective peripheral elevation site 136, 138, 140 to vary, for example to raise or lower. By way of further example with reference to the first motor 172, actuation of the first gearbox 130 results in the first output shaft 133 of the first gearbox 130, which is constrained to rotational movement, to rotate in a clockwise or anticlockwise direction (depending upon the instructed direction to the first motor 172), which results in revolute motion of the first lower control arm 116 about the longitudinal axis of the first output shaft 133 owing to the constraint of the revolute joint 132. The second and third motors 174, 176 are equally capable of affecting such movement in respect of the second and third linkages 112, 114. As can be seen, the first, second and third peripheral elevation sites 136, 138, 140 can therefore be raised or lowered independently as required by the processing resource 222 under the control of the vehicle simulation software. In this regard, elevation and lowering of each of the first, second and third elevation sites 136, 138, 140 by the first, second and third linkages 110, 112, 114 is selective. The movement of the first, second and third linkages 110, 112, 114 to raise and lower selectively the first, second and third peripheral elevation sites 136, 138, 140 enables roll, pitch and/or heave to be applied to a payload, for example the simulator cockpit, disposed upon the payload platform 134.

Of course, the skilled person should appreciate that the above-described example, where the lower control arms 116, 148, 160 are secured to respective output shafts of a transverse motor/gearbox arrangement, is not the only manner of elevating the lower control arms 116, 148, 160. For example, a motor and gearbox arrangement can be directly attached to the lower control arms 116, 148, 160, or in another example a pushrod arrangement can be employed whereby a motor and gearbox act through a linkage mechanism attached to each of the lower control arms 116, 148, 160 in order to form a bell-crank arrangement.

In relation to yaw movements, yaw movement is calculated in a like manner to that described above in relation to heave, roll and/or pitch movements based upon output of the physics model and the motion cue filter to obtain the required movements in 4 degrees of freedom, which are then used to calculate (Step 410), inter alia, yaw movement required of the rotatable base stage 102 (the logical motion control), which is provided (Step 412) as a stream of position demands delivered in real time to the power drive unit 200 in terms of the work to be performed by the yaw table motor and gearbox unit 192. The power drive unit 200 responds to receipt of the yaw command(s) by generating and sending (Step 414) a rotation actuation signal to the yaw table motor and gearbox unit 192. Thereafter, in response to the rotation actuation signal, the yaw table motor and gearbox unit 192 associated with rotation of the base stage 102 actuates (Step 416). Operation of the motor of the yaw table motor and gearbox unit 192 in accordance with the rotation actuation signal results in the motor and gearbox unit 192 rotating (Step 418) the base stage 102 in the manner required by the processing resource 222. The payload platform 134 and thus the cockpit being carried by the payload platform 134 therefore undergoes the rotational movement applied to the base stage 102.

Figure 7:
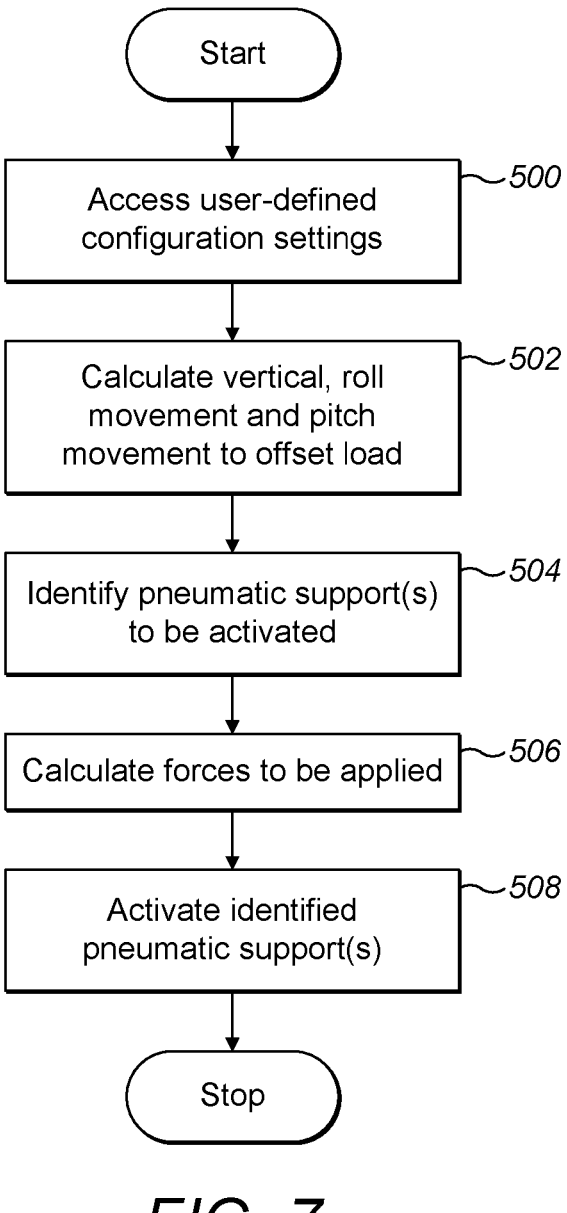
FIG. 7 is a flow diagram of a first method of supporting a payload platform constituting a further embodiment of the invention.

Referring to FIG. 7, the cockpit weight due to gravity must be continually reacted with a vertical force. Furthermore, the centre of gravity of the cockpit (not shown) attached to the payload platform 134 is often off-centred with respect to the payload platform 134 and this will cause a roll moment and pitch moment which must also be continually reacted. As such in this example, prior to operation, the amount the centre of gravity of the cockpit is offset with respect to the payload platform 134 is measured and stored in the storage device 226. Other implementations are possible and will be described later herein.

Thus, when the simulation software is initialised (Step 302), part of the initialisation process includes, in this example, the processing resource 222 retrieving the user-defined configuration settings (Step 500), which includes the offset information stored in the storage device 226. In this regard, the processing resource 222 supports, in this example, a configurator 246 that retrieves the user-defined configuration settings and calculates (Step 502) the forces that the first, second and third pneumatic supports 204, 206,

208 have to apply in order to compensate for the cockpit weight due to gravity and the offset centre of gravity of the cockpit with appropriate restorative vertical force, roll moment and pitch moment.

Using the calculated restorative forces and moments of pitch and roll, the configurator 246 of the processing resource 222 then identifies (Step 504) which of the first, second and third pneumatic supports 204, 206, 208 need to be set. The configurator 246 also calculates (Step 506) application support forces to be applied by the identified pneumatic supports of the first, second and third pneumatic supports 204, 206, 208. In other examples, the forces to be applied by the first, second and third pneumatic supports 204, 206, 208 or the settings of the first, second and third pneumatic supports 204, 206, 208 can be pre-calculated and constitute the user-defined configuration settings. Indeed, in such examples, the user-defined configuration settings can be calculated as a function of a mass of the payload and a distribution of the mass of the payload with respect to the payload platform 134. Indeed, in another exemplary implementation, where the forces are updated dynamically, the forces can be automatically calculated repeatedly during operation of the apparatus 100.

Once the forces to be applied by each of the first, second and third pneumatic supports 204, 206, 208 have been calculated (Step 506), the configurator 246 instructs the power drive unit 200 to pressurise (Step 508) the first, second and third pneumatic supports 204, 206, 208 so as to apply the calculated forces for each of the first, second and third pneumatic supports 204, 206, 208. In this regard, adjustment of pressurisation of the first, second and third pneumatic supports 204, 206, 208 is independent of one another. In response to the instruction from the processing resource 222, the power drive unit 200 sends control signals to the first pneumatic inflation unit 210, the second pneumatic inflation unit 212 and the third pneumatic inflation unit 214 to inflate the first, second and third pneumatic supports 204, 206, 208, respectively. The first, second and third pneumatic supports 204, 206, 208 therefore apply independently the calculated forces, and so are independently configurable and/or actuatable, thereby reducing the workload of each of the first, second and third, electric motors 172, 174, 176.

In this example, the forces to be applied by the first, second and third pneumatic supports 204, 206, 208 are calculated once and applied once throughout operation of the motion platform apparatus 100 in accordance with the user-defined configuration settings. In this regard, the calculated forces can be calculated manually at start-up of the apparatus 100 or automatically at start-up of the apparatus 100. Furthermore, although in this example, the setting of the first, second and/or third pneumatic supports 204, 206, 208 is automatic, the manually or automatically calculated forces can be applied by manual setting of the first, second and/or third pneumatic supports 204, 206, 208, via a manual control (not shown) therefor, thereby permitting respective manual pressurisation of each of the first, second and/or third pneumatic supports 204, 206, 208. In another example, the forces applied by the first, second and third pneumatic supports 204, 206, 208 can be calculated automatically and varied dynamically during operation of the motion platform apparatus 100.

Figure 8:
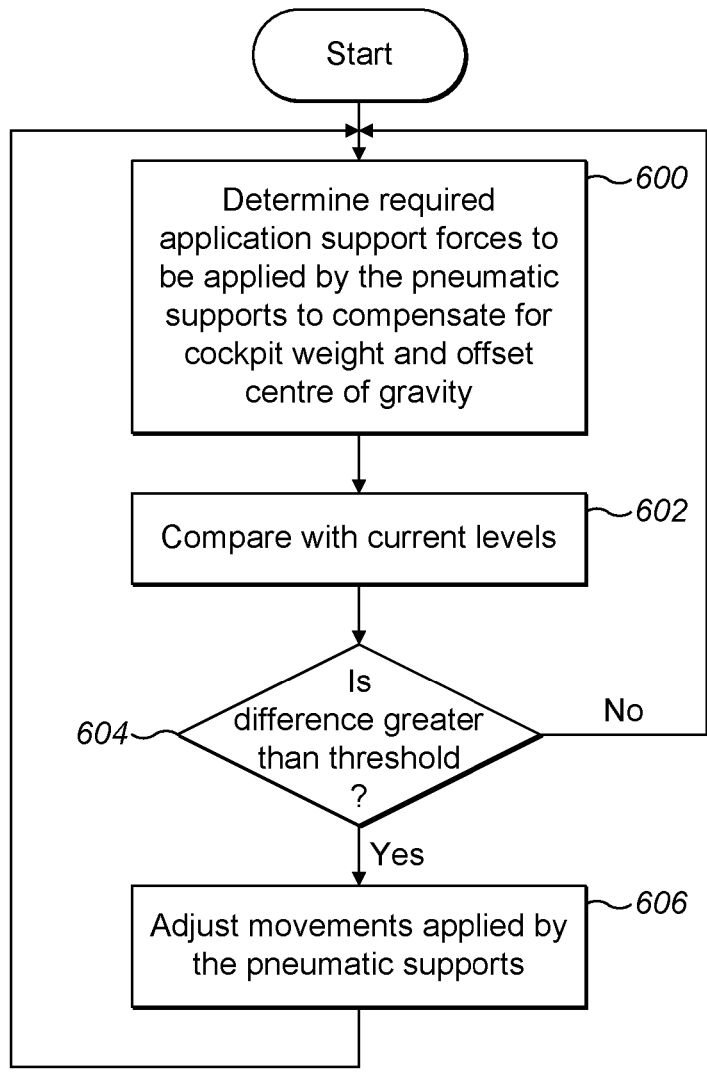
FIG. 8 is a flow diagram of a second method of supporting a payload platform constituting a yet another embodiment of the invention.

In this respect, and referring to FIG. 8, the processing resource 222 then calculates (Step 600) current extensions of the first, second and third linkages 110, 112, 114, and therefore the application support forces required to be applied by the first, second and third pneumatic supports 204, 206, 208 in order to compensate for the cockpit weight due to gravity and the offset centre of gravity of the cockpit with appropriate restorative vertical force, roll moment and pitch moment. The calculated forces are then compared (Step 602) with forces currently being applied by the first, second and third pneumatic supports 204, 206, 208. Predetermined thresholds are set prior to operation in relation to deviation of the forces being applied by the first, second and third linkages 110, 112, 114 from the forces currently being applied by the first, second and third pneumatic supports 204, 206, 208. One of more of the predetermined thresholds can be a range of forces bounded by a minimum acceptable force and a maximum acceptable force. If the deviation is not greater than the predetermined thresholds (Step 604), the processing resource 222 continues to calculate vertical force and pitch and roll moments and determine whether the forces applied by the first, second and third pneumatic supports 204, 206, 208 need to be adjusted (Steps 600 to 604). However, if the deviation is greater than the predetermined thresholds (Step 604), the processing resource 222 adjusts (Step 606) the forces applied by the first, second and third pneumatic supports 204, 206, 208 to the calculated current required levels (Step 600). In this regard, and as in relation to the preceding example, the processing resource 222 instructs the power drive unit 200 to pressurise the first, second and third pneumatic supports 204, 206, 208 so as to apply the calculated forces for each of the first, second and third pneumatic supports 204, 206, 208. In response to the instruction from the processing resource 222, the power drive unit 200 sends control signals to the first pneumatic inflation unit 210, the second pneumatic inflation unit 212 and the third pneumatic inflation unit 214 to inflate or deflate the first, second and third pneumatic supports 204, 206, 208, respectively. As such, the change in the application of support forces is made in real time. Thereafter, the processing resource 222 continues to calculate vertical force and roll and pitch moments and determine whether the forces applied by the first, second and third pneumatic supports 204, 206, 208 need to be adjusted (Step 600 to 604).

The skilled person should appreciate that the above-described implementations are merely examples of the various implementations that are conceivable within the scope of the appended claims. In this regard, although the above examples assume that each pneumatic support 204, 206, 208 (deployed either as a pair for each lower control arm or as a single support for each lower control arm), has a respective pneumatic reservoir 216, 218, 220 associated with each lower support arm 116, 148, 160, other ways of serving the pneumatic supports 204, 206, 208 are possible depending upon the manner in which the pneumatic supports 204, 206, 208 are used. For example, where the pneumatic supports 204, 206, 208 are set at start-up prior to use, the pneumatic reservoir 216, 218, 220 for each of the pneumatic supports 204, 206, 208 can be connected to a single pneumatic inflation unit via a three-way valve. In another example, a common reservoir can be shared by the pneumatic supports 204, 206, 208, inflation of each pneumatic support 204, 206, 208 being provided by the respective pneumatic inflation units 210, 212, 214. In a further example, each pneumatic support 204, 206, 208 can be served by a respective compressed air supply without the use of an associated reservoir.

Although the above examples describe simulation of a vehicle, it should be appreciated that all aspects of a vehicle need not be simulated, and the vehicle simulation can be in respect of one or more performance aspects of a vehicle. Furthermore, the motion platform apparatus 100 is not intended for exclusive use in land based vehicle simulation and other applications are contemplated, for example amphibious or aeronautical vehicles, or indeed any application in which it is desired to apply motion to a human occupant.

In the examples set forth herein, references to position of any element, such as upper or lower or above or below, are made in the context of the position of the element relative to the ground. However, the skilled person should appreciate that such ground-referenced terms are not intended to be limiting and can be appropriately adjusted where it is possible to orientate the element differently to the ground reference.

The invention claimed is:

1. A motion platform apparatus for vehicle simulation, the apparatus comprising:
   a payload platform for supporting a cockpit, the payload platform having peripheral elevation sites;
   a base stage having peripheral anchoring sites; and
   a plurality of linkages configured to couple the peripheral anchoring sites to the peripheral elevation sites, respectively, the plurality of linkages each being configured to vary elevation of a respective elevation site of the payload platform;
   a plurality of configurable pneumatic supports respectively configured to adjust pressurisation independently of one another, thereby providing support to the payload platform; and
   a processing resource configured to adjust forces applied by the plurality of configurable pneumatic supports to compensate for an offset center of gravity of the cockpit.

2. An apparatus as claimed in claim 1, wherein the plurality of pneumatic supports is respectively operably coupled to the plurality of linkages.

3. An apparatus as claimed in claim 1, further comprising:
   a plurality of actuators configured to move the plurality of linkages respectively over a respective range of extension.

4. An apparatus as claimed in claim 3, wherein
   each of the plurality of linkages has a base stage end and a payload platform end distal from the base stage end; and
   the plurality of actuators is respectively operably coupled to the plurality of linkages at the respective base stage end thereof.

5. An apparatus as claimed in claim 1, the processing resource comprising a configuration unit; wherein
   the configuration unit is configured to receive a plurality of pre-calculated configuration settings in respect of the plurality of configurable pneumatic supports; and
   the configuration unit is further configured to control pressurisation of each of the plurality of configurable pneumatic supports in accordance with the plurality of pre-calculated configuration settings.

6. An apparatus as claimed in claim 1, further comprising:
   a memory configured to store a mass of a payload and a position of a center of gravity of the payload with respect to the payload platform carrying the payload; wherein:
   the processing resource is configured to calculate, when in use, a current extension of a linkage of the plurality of linkages and a required support force to be applied at the payload platform;
   the processing resource is further configured to calculate a support force to be applied by a configurable pneumatic support of the plurality of configurable pneumatic supports in response to the calculated current extension of the linkage of the plurality of linkages and the required support force to be applied at the payload platform; and the processing resource is configured to control pressurisation of the configurable pneumatic support of the plurality of configurable pneumatic supports in accordance with the calculated support force to be applied.

7. An apparatus as claimed in claim 1, further comprising:

a manual control operably coupled to the plurality of configurable pneumatic supports, thereby permitting, when in use, respective manual pressurisation of each of the plurality of configurable pneumatic supports.

8. An apparatus as claimed in claim 1, wherein the plurality of pneumatic supports is a plurality of air springs.

9. An apparatus as claimed in claim 1, wherein the plurality of linkages comprises a first linkage, the first linkage comprising a first arm operably coupled at a first end thereof to a second arm at a first end thereof;

the first arm is operably coupled at a second end thereof to a first anchoring site of the peripheral anchoring sites;

the second arm is operably coupled at a second end thereof to a first elevation site of the peripheral elevation sites; and a first configurable pneumatic support of the plurality of configurable pneumatic supports is operably coupled to the first linkage.

10. An apparatus as claimed in claim 9, wherein the first arm is operably coupled to the second arm by a spherical joint;

the first arm is operably coupled to the first anchoring site by a revolute joint; and the second arm is operably coupled to the first elevation site by a revolute joint.

11. An apparatus as claimed in claim 1, further comprising:

a turntable comprising the base stage.

12. An apparatus as claimed in claim 1, further comprising:

a translation stage linearly translatable in two substantially perpendicular directions, the motion platform apparatus being operably coupled to the translation stage.

13. A vehicle simulator system, the system comprising:

the motion platform apparatus as claimed in claim 1.

14. A system as claimed in claim 13, further comprising the cockpit disposed upon the payload platform.

15. A method of supporting a payload platform supporting a cockpit of a vehicle simulator system, the method comprising:

coupling a plurality of peripherally-spaced linkages between peripheral anchoring sites of a base stage and a plurality of peripheral elevation sites of the payload platform;

the plurality of peripherally-spaced linkages each respectively selectively varying elevation of a respective peripheral elevation site of the plurality of peripheral elevation sites of the payload platform;

calculating forces that compensate for an offset center of gravity of the cockpit; and adjusting pressurisation independently of one another of a plurality of configurable pneumatic supports to provide support to the payload platform and to apply the calculated forces.

* * * * *